MEANS FOR LOCATING AN INOPERATIVE SIGNALLING REPEATER

Filed Dec. 16, 1960 4 Sheets-Sheet 1

Sept. 18, 1962 D. G. HOLLOWAY ETAL 3,054,865

MEANS FOR LOCATING AN INOPERATIVE SIGNALLING REPEATER

Filed Dec. 16, 1960 4 Sheets-Sheet 4

United States Patent Office 3,054,865
Patented Sept. 18, 1962

3,054,865

MEANS FOR LOCATING AN INOPERATIVE SIGNALLING REPEATER

Dennis Godson Holloway and Geoffrey Eric Parrett, Taplow, England, assignors to British Telecommunications Research Limited, Taplow, England, a British company Filed Dec. 16, 1960, Ser. No. 76,202
Claims priority, application Great Britain Dec. 16, 1959
10 Claims. (Cl. 179—175.31)

The present invention relates to carrier telecommunication systems over a cable and is more particularly concerned with the provision of supervisory equipment for monitoring the state of the signalling cable and of the amplifying equipment in the various repeater stations.

In systems of the type concerned, it is usual to provide such repeater stations at comparatively short intervals along the length of the line so that on an extensive system there may well be a large number of stations. Some of these may be in somewhat inaccessible positions and the great majority will be normally unattended but in any event it is very important to have fairly accurate guidance available at a supervisory station as to the location of any fault which may develop.

One possible method for producing this result is to arrange that a number of repeater stations along a transmission line are fed on a constant current basis and arrangements are provided whereby when the power is first switched on, the stations are brought into action successively. By means of separate supervisory conductors and a series of chain-connected contacts operated by relays in the feed circuit, it is possible to give indications of any abnormal conditions which may occur so that the location of any faults may be readily estimated. In some circumstances, however, it may not be convenient or possible to provide the separate signalling conductors necessary for this system and the chief object of the present invention is to give comparable information making use only of the circuit used both for power feed and transmission which may conveniently comprise a single co-axial cable.

According to the invention, in a supervisory arrangement for a carrier telecommunication system employing a plurality of repeater stations which are fed from a terminal station over a signalling cable which connects the stations, the system also including arrangements whereby when power is first applied at the terminal station the various repeater stations are energised successively, a signal generator in each station is brought momentarily into operation when the station receives power and transmits a momentary signal to the terminal station over the signalling cable so that the number of such signals received thereat indicates the number of stations which are working satisfactorily.

Figure 1:
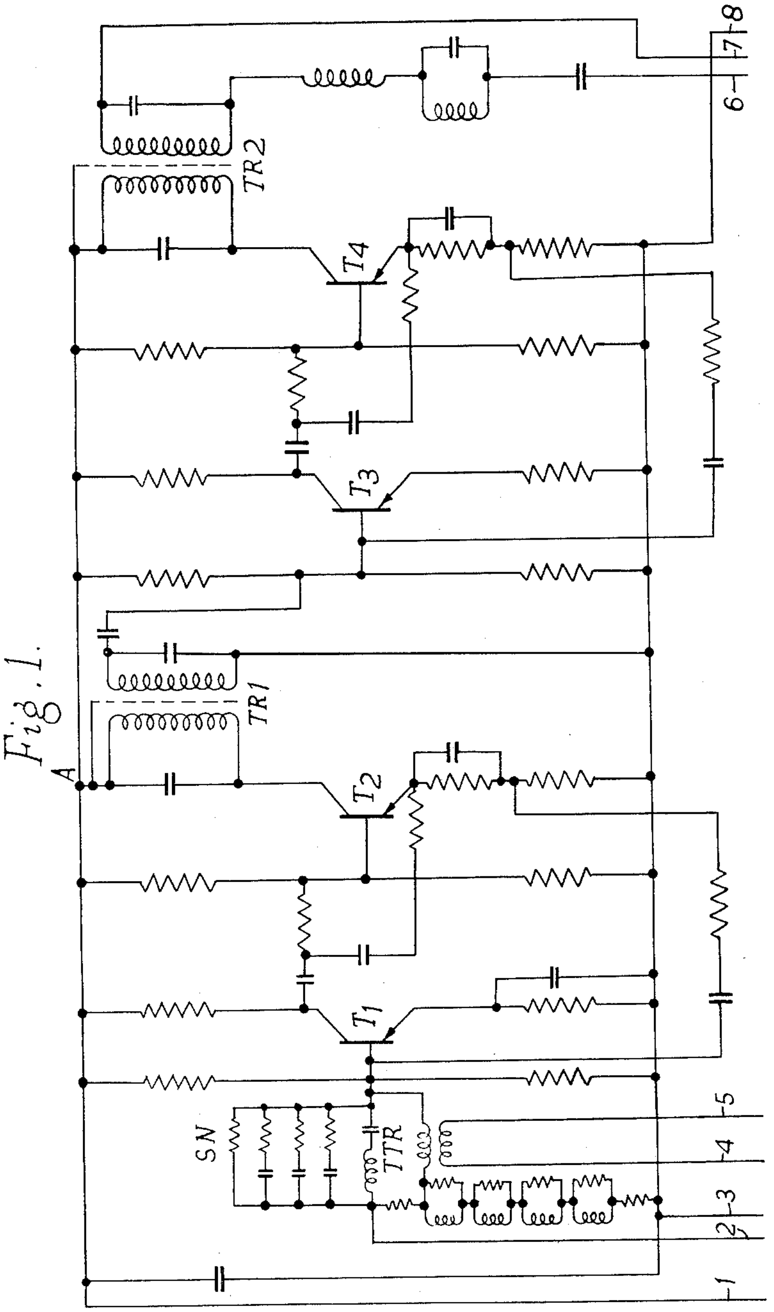
Figure 2:
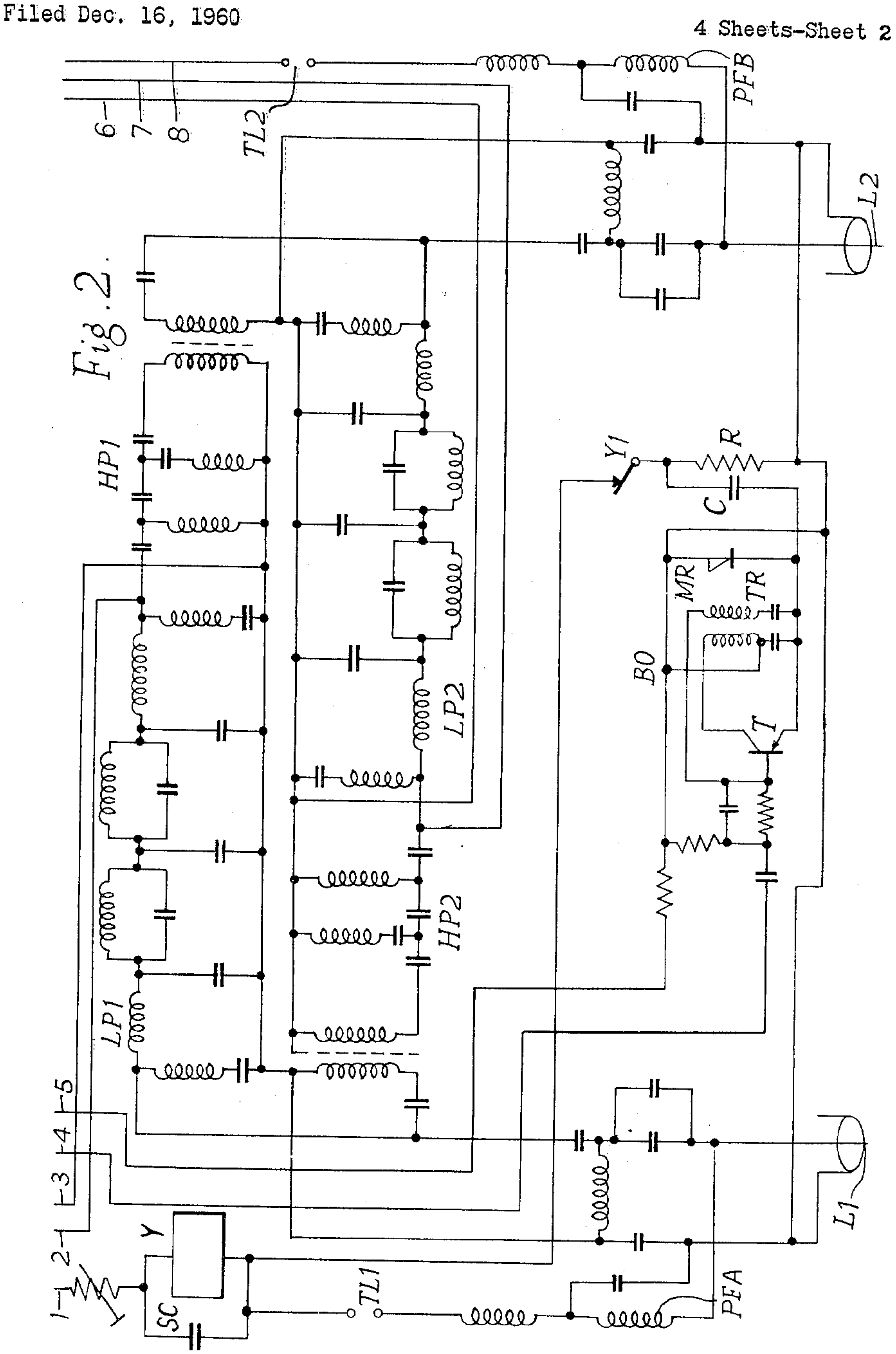
Figure 3:
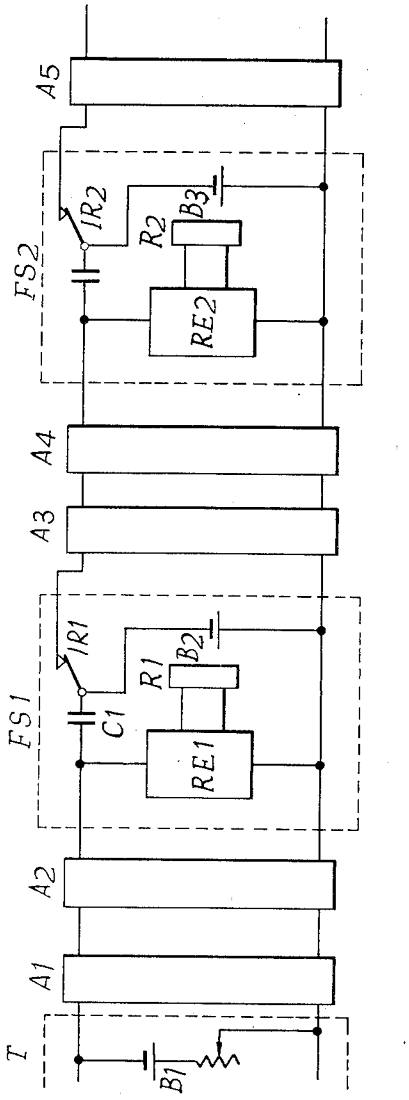

The invention will be better understood from the following detailed description of one method of carrying it into effect which should be taken in conjunction with the accompanying drawings comprising FIGURES 1–4. FIGURES 1 and 2 when assembled with FIGURE 2 beneath FIGURE 1 and the appropriate conductors in alignment show the detailed circuits of one of the stations, including the arrangements for producing the momentary signal in the form of a burst of tone when power is first applied thereto. FIGURE 3 indicates diagrammatically a further development which may be desirable to cater for power feeding from an intermediate point and FIGURE 4 indicates a convenient method which may be used for distinguishing between a transmission and a cable or power fault.

As already suggested, the system is assumed to employ a single co-axial cable for both the Go and Return paths which are located in different bands in the frequency spectrum so that by the use of suitable high and low pass filters use may be made of a so-called both-way amplifier, that is to say a single amplifier is adapted to be effective for both the Go and Return transmission paths.

Considering now the circuit of FIGURES 1 and 2, it is assumed that the signalling cable, which is a single co-axial cable, comes in from the direction of the feeding station at the bottom left-hand part of FIGURE 2, the central conductor being represented by L1. Similarly the outgoing conductor to the next station on the side remote from the feeding station has the central conductor L2 as shown bottom right in FIGURE 2. The station includes in the power feed circuit over the central conductor the relay Y having a contact Y1 under the control of which the resistor R is connected across the two signalling conductors. The station equipment includes the power separating filters PFA and PFB which prevent interference between the power supply and the intelligence transmitting circuit. FIGURE 2 also shows the low pass filters LP1 and LP2 which pass the low frequency currents which are assumed to be employed for the Go direction of transmission and the high pass filters HP1 and HP2 which pass only high frequency currents for transmission in the Return direction. From the junction point of filters LP1 and HP1 connections extend over leads 2 and 3 and by way of a shaping network SN to the input to the main amplifier A. This as shown comprises two two-stage transistor units which are transformer coupled, feedback being provided between the two stages of each unit such that the current gain is substantially unity but that the transformer which is of the step-down type provides appreciable current gain. The first unit includes the transistors T1 and T2 supplying an output to the transformer TR1 and this feeds the second unit comprising the transistors T3 and T4 giving an output by way of transformer TR2. This output is applied over leads 6 and 7 to the junction of the filters LP2 and HP2 whence depending on the frequency band it extends to conductors L1 and L2. It will be appreciated that with the arrangement shown a low frequency input is applied to the conductor L1 so that the path of the signals in the Go direction is over filter LP1, leads 2 and 3, amplifier A, leads 6 and 7, filter LP2 to conductor L2. Similarly for the Return direction which uses the high frequency portion of the spectrum, signals incoming over L2 pass by way of filter HP1 to the input to the amplifier A and from the output over filter HP2 and thence to conductor L1. It will be noted that the constant direct current which flows over the signalling circuit supplies power to the amplifier A over leads 1 and 8. The terminals TL1 and TL2 will normally be bridged respectively by links and provide facilities for re-arranging the circuits.

In order to simplify the understanding of the working of the circuit, it will be assumed that the station in question is the first one from the terminal station. The resistor R is conveniently arranged to have a value substantially equal to that of the loop circuit represented by all the remaining stations including their various shunting resistors. Consequently relay Y is traversed by approximately half the total current flowing and this is sufficient to cause its operation. Moreover it receives more current than any of the relays in succeeding stations since they are shunted by their associated resistors and this serves to prevent their operation. Relay Y on operating, by opening contacts Y1 removes resistor R from across the line and thus increases the current through its own winding and also increases the current over the line to the next station to a value sufficient to enable the Y relay therein to operate. This process is repeated all down the line to the most distant station fed from this terminal station. For the purposes of the present invention it may be desirable to arrange for the Y relays to be slightly slow to operate, for instance due to the shunting capacitor SC shown. The condition of normal operation is that all the Y relays in the different stations are energised.

When the power is first connected however, a charging circuit is completed for capacitor C by way of rectifier MR which is preferably a Zener diode. As just mentioned, relay Y is preferably slightly slow to operate so as to give time for this charging operation to take place. When contacts Y1 open however, the capacitor C is enabled to discharge through resistor R and supply power to the blocking oscillator BO which consists essentially of the transistor T and the transformer TR and may incorporate the shunt resistor R. This oscillator thereupon produces oscillations for a short period and these are applied to the primary of the transformer TTR, FIGURE 1, over leads 4 and 5 and by way of the secondary are fed into the signalling circuit. Preferably the oscillator is arranged to be self-modulating at an audio frequency for ease of detection at the terminal station. The oscillations produced will contain a number of harmonics some of which will be included in the high frequency and low frequency bands corresponding to the Go and Return circuits. The oscillations it will be noted are applied to the input to the amplifier A and consequently they are amplified and can be transmitted in both directions so that it is possible to receive them without undue attenuation at either terminal station. Moreover the fact that the capacitor C is gradually discharging will tend to alter the basic oscillation frequency of the blocking oscillator and thus further ensure that components are produced which will be included in both the appropriate bands.

This operation is repeated with a slight time displacement at each of the other intermediate stations concerned and consequently short bursts of tone are transmitted successively. These may be counted by the attendant at the terminal station to whom they are made audible or arrangements may be made for them to operate a counter which will give a direct visual indication.

On an extensive system where one or more intermediate power feeding stations have to be provided between the terminal stations, the simple arrangement described above may not be entirely satisfactory since this arrangement requires that power should be disconnected and re-applied at an intermediate feeding station also. This can however conveniently be arranged by transmitting a characteristic tone from the attended station when the appropriate number of bursts of tone have been received back corresponding to the stations up to the intermediate feeding station. This is illustrated diagrammatically in FIGURE 3 where the terminal station is represented by T and the various non-feeding stations by A1, A2, A3, A4, A5. The stations FS1 and FS2 are intermediate feeding stations and it will be noted that they include equipment slightly different from the ordinary stations.

Considering particularly the station FS1, this will include a blocking capacitor C1 which prevents the direct current feed on a constant current basis from extending to the stations A3 and A4. These stations and any other included between the two intermediate feeding stations FS1 and FS2 are fed from the source represented diagrammatically by the battery B2 in the station FS1. It will be noted that this is connected up over normally made contacts IR1 of the relay R1. This relay is controlled by means of the responding equipment RE1 so that when a signal is received over the line which operates this equipment, relay R1 is operated. Thereupon it opens the contact IR1 and thus removes the power supply to the stations A3, A4 . . . . As suggested the equipment RE1 is arranged to respond to a characteristic tone while the similar equipment RE2 in the station FS2 responds to a tone of a different frequency. With this arrangement as long as the appropriate tone is applied, the power supply is withheld and consequently all the stations concerned become inoperative. When the signal received by the equipment RE1 ceases, relay R1 releases and again closes its contacts IR1 so that power is re-applied and accordingly the stations A3, A4 . . . become operative in turn. As a result bursts of tone are received which pass through the station FS1 and are transmitted back to the terminal station T.

Alternatively it may be arranged that the equipment RE1 responds to the removal of power in response to an operation at the station T. In this case however the arrangement would preferably be that the relay R1 and the similar relay R2 in the station FS2 would be normally operated, that is to say they would be operated when the power was first switched on and would then close normally open contacts to supply power to the section of line for which they supplied the feed. Consequently if the feed is removed at the terminal station T, relay R1 would release and in turn remove power from the next section of line, thereby producing the release of relay R2 which similarly would remove power from the section of line for which it was responsible. In this case relay R1 would be connected in a somewhat similar circuit to the Y relays in the stations A1 and A2 so that relay R1 preferably did not operate until the various other stations had been powered.

Figure 4:
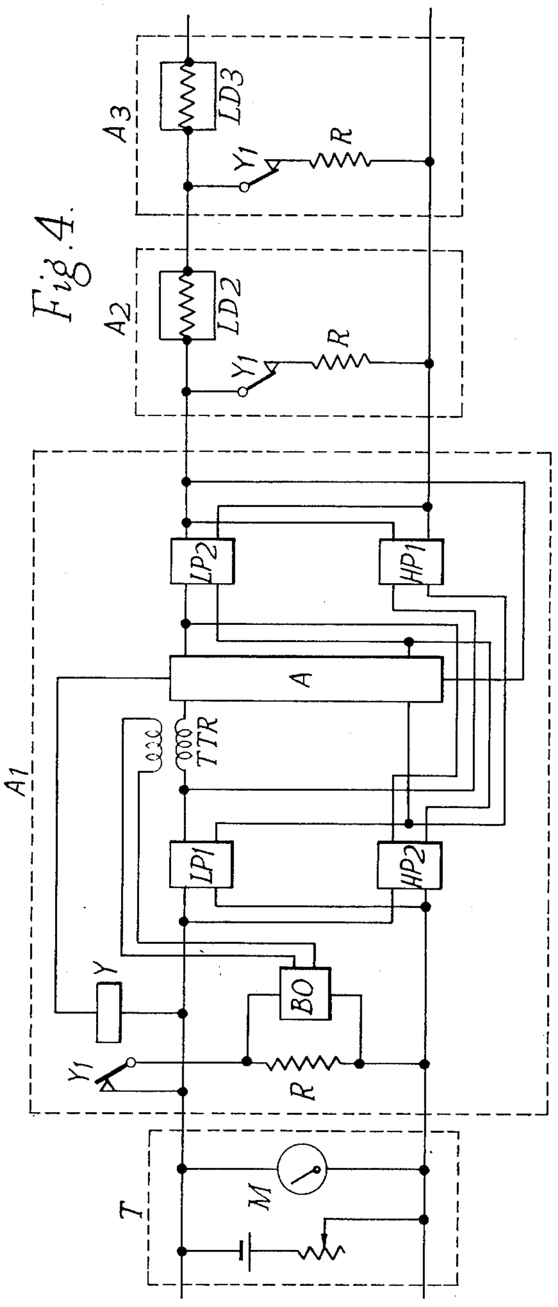

Though the arrangement above described can be used to give information as to location when a fault is indicated by the failure of the pilot which is usually employed in connection with gain control, it does not indicate the nature of the fault, that is whether it is a transmission fault due to the failure of an amplifier or a cable, or power fault resulting from damage to the cable. A further modification indicated in FIGURE 4 is intended to take care of this point. The station A1 represented by the dotted rectangle shows diagrammatically the equipment shown in detail in FIGURES 1 and 2. Thus the relay Y is connected in the power feed over the upper conductor and controls the contacts Y1 by means of which the resistor R is connected across the signalling lines. Resistor R is shunted by the blocking oscillator from which connection extends to the transformer TTR in the transmission circuit. The amplifier A is used for both directions of transmission, the Go direction making use of low pass filters LP1 and LP2 while the Return direction makes use of the high pass filters HP2 and HP1. In the stations A2 and A3 the resistors connected across the signalling circuit by corresponding Y1 contacts are shown, but the load represented by the amplifier is indicated diagrammatically at LD2 in station A2 and at LD3 in station A3. In station T the power supply is under the control of an automatic constant current regulator which maintains the current value unchanged during the switching-on operation as well as during normal working.

When the power is switched on, it is clear that transmission is tested as each oscillator emits its signal. If this is correctly received at the supervisory point, it is established both that the station concerned is working satisfactorily and also that the transmission path back to the supervisory point is sound. If there is a cable fault, say a short circuit, then the voltage due to the power feed as indicated on the meter M at the terminal station T will rise progressively to a value equal to the sum of the amplifier voltages between the terminal station and the fault, neglecting the voltage drop in the line. If an open circuit exists, then the voltage only rises to the sum of the amplifier voltages between the terminal station and the fault, plus the voltage across one of the shunt resistors R. Hence when the system is first switched on, the power-fed voltage indicated on the meter M will start to rise as the different stations are switched in and the oscillator signals will be received. If there is a transmission fault only, the signals will cease when switching has taken place up to that point but the voltage will rise to its final value. If there is a power feed or cable fault, the voltage will not rise to its normal value and the value reached gives an indication of the nature and position of the fault. Moreover if it is arranged that the voltage across the shunt resistor is different from that across the amplifier, it can readily be determined from the meter reading whether the fault is an open circuit or a short circuit. Alternatively, it may be arranged that the voltages across the resistor and the amplifier are equal which gives better discrimination on the meter. The nature of the fault can in this case be ascertained from the number of tone signals since if there is an open circuit the final station before it will not be powered whereas it will be if there is a short-circuit and consequently a tone signal will be received from it.

We claim:

1. In a carrier telecommunication system, a plurality of repeater stations, a terminal station, a signalling cable extending from said terminal station and passing through each of said repeater stations, a source of electric power in said terminal station, means for connecting said power source to said cable to feed operating power from said source over said cable to said repeater stations, means in said repeater stations responsive to the operation of said connecting means for operatively applying power to said repeater stations in succession, a signal generator in each repeater station, means for momentarily operating each of said signal generators when power is first applied to the associated station to transmit a signal over said cable, and means at said terminal station for responding to said signals.

2. In a carrier telecommunication system, a plurality of repeater stations, a terminal station, a signalling cable extending from said terminal station and passing through each of said repeater stations, a source of electric power in said terminal station, means for connecting said power source to said cable to feed operating power from said source over said cable to said repeater stations, means in said repeater stations responsive to the operation of said connecting means for operatively applying power to said repeater stations in succession, a signal generator in each repeater station, means for momentarily operating each of said signal generators when power is first applied to the associated station to transmit a signal over said cable, and means at said terminal station for rendering said signals audible.

3. In a carrier telecommunication system, a plurality of repeater stations, a terminal station, a signalling cable extending from said terminal station and passing through each of said repeater stations, a source of electric power in said terminal station, means for connecting said power source to said cable to feed operating power from said source over said cable to said repeater stations, means in said repeater stations responsive to the operation of said connecting means for operatively applying power to said repeater stations in succession, a signal generator in each repeater station, all said generators being substantially identical, means for momentarily operating each of said signal generators when power is first applied to the associated station to transmit a signal over said cable, and counting means at said terminal station for counting the number of signals received successively from said repeater stations as power is operatively applied thereto.

4. In a carrier telecommunications system, a plurality of repeater stations, a terminal station, a signalling cable extending from said terminal station and passing through each of said repeater stations, a source of electric power in said terminal station, means for connecting said power source to said cable to feed operating power from said source over said cable to said repeater stations, means in said repeater stations responsive to the operation of said connecting means for operatively applying power to said repeater stations in succession, a blocking oscillator in each repeater station, a capacitor in each repeater station, means for charging each of said capacitors when power is applied to the associated repeater station, means for discharging said capacitors to cause the respective blocking oscillators to transmit a signal to said terminal station, and means at said terminal station for responding to said signals.

5. A carrier telecommunication system as claimed in claim 4, including an oscillator which is self-modulating at an audio frequency.

6. A carrier telecommunication system as claimed in claim 4, including an oscillator deriving its power from a capacitor which is gradually discharged so that the frequency of the oscillations varies.

7. In a carrier telecommunication system, a plurality of repeater stations, a terminal station, a signalling cable extending from said terminal station and passing through each of said repeater stations, a source of electric power in said terminal station, control means in said terminal station for causing said source to supply a constant current over said cable for operating equipment in each of said repeater stations in series, a relay in each repeater station connected in said supply circuit, a resistor in each repeater station connected in shunt of the signalling cable on the terminal station side of the relay, said resistor in each case having a value substantially equal to the combined resistance of the parallel loops formed by the resistors in the stations on the far side of the station concerned, whereby when power is initially connected to said cable by said control means in said terminal station, the relays in successive repeater stations are operated in turn to cut out the associated resistors from in shunt of the signalling cable so as to permit the station concerned to be operatively powered, a signal generator in each repeater station, means responsive to the operative application of power to each repeater station for operating said generators in turn to transmit signals to said terminal station, and means at said terminal station for responding to said signals.

8. In a carrier telecommunication system, a plurality of repeater stations, a terminal station, a signalling cable extending from said terminal station and passing through each of said repeater stations, a first source of electric power in said terminal station, a second source of electric power in one of said repeater stations, means for feeding operating power from said terminal station to the repeater stations between said terminal station and said one repeater station, means for feeding operating power from said one repeater station to the remaining repeater stations not fed from said terminal station, means for transmitting signals from said terminal station to said one repeater station, means in said one repeater station and responsive to said signals for interrupting and connecting said power feed to said remaining repeater stations, means for operatively applying power to said remaining repeater stations in succession when power is connected at said one repeater station, a signal generator in each of said remaining repeater stations, and means responsive to the operative application of power in succession to each of said remaining repeater stations for operating said signal generators in turn to transmit signals to said one repeater station.

9. A carrier telecommunication system as claimed in claim 8 in which said responding means in said one repeater station is responsive to the interruption and connection of said first source of electric power in said terminal station.

10. A carrier telecommunication system as claimed in claim 8 in which said responding means in said one repeater station is responsive to tone signals of predetermined frequency transmitted from said terminal station.

References Cited in the file of this patent

UNITED STATES PATENTS

| | | |
|---|---|---|
| 2,315,435 | Leibe | Mar. 30, 1943 |
| 2,509,365 | Parmentier | May 30, 1950 |
| 2,564,010 | Jacobs | Aug. 14, 1951 |